July 18, 1939.  V. L. BARR  2,166,673
ROLLER RETAINER RING AND RACE MEMBER ASSEMBLY FOR ROLLER BEARINGS
Filed May 21, 1938  2 Sheets-Sheet 1
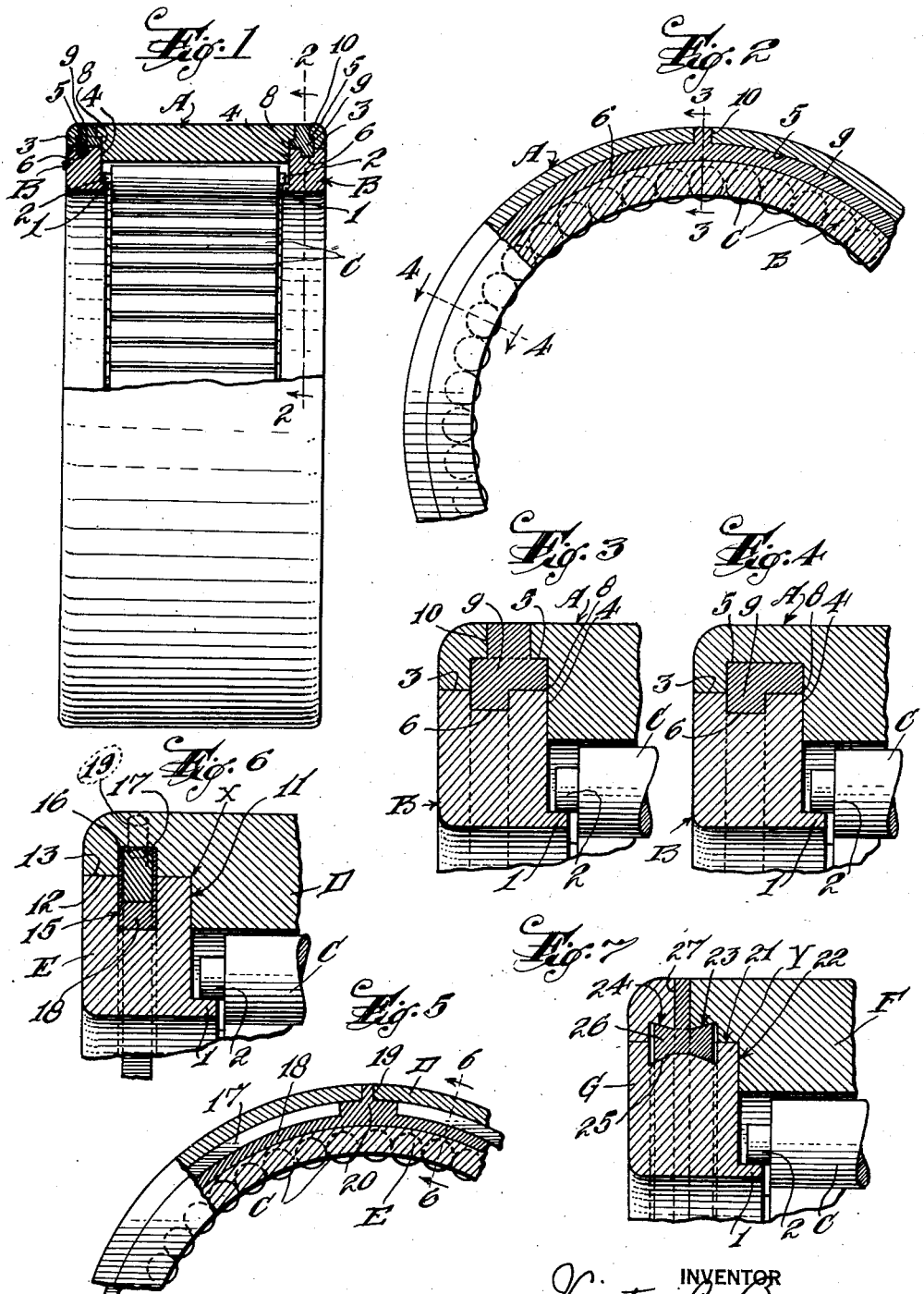
INVENTOR
Victor L. Barr
BY
Harry B. Kook
ATTORNEY

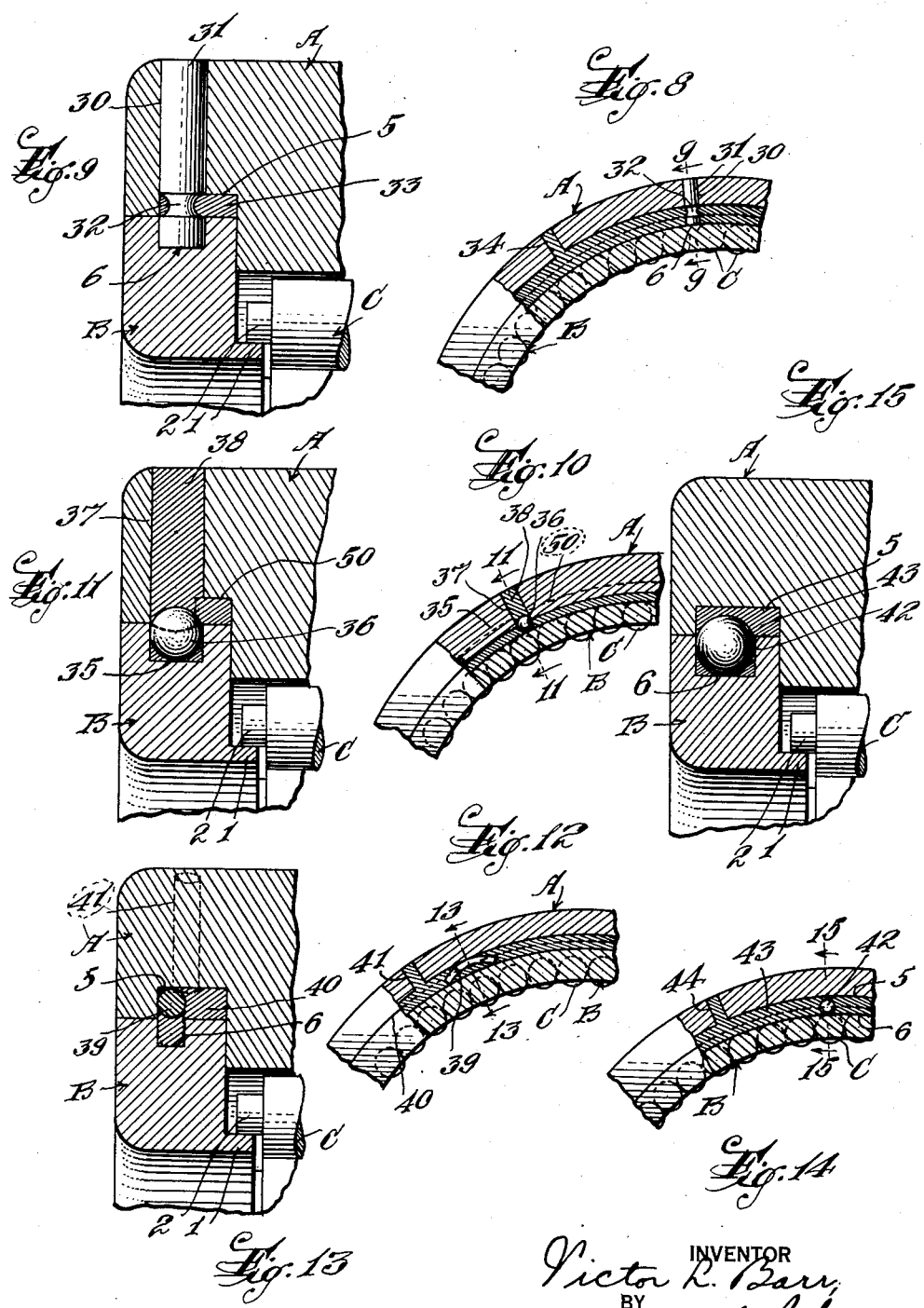

Patented July 18, 1939

2,166,673

UNITED STATES PATENT OFFICE 2,166,673

ROLLER RETAINER RING AND RACE MEMBER ASSEMBLY FOR ROLLER BEARINGS

Victor L. Barr, Philadelphia, Pa., assignor to Roller Bearing Company of America, Trenton, N. J., a corporation of New Jersey Application May 21, 1938, Serial No. 209,207

7 Claims. (Cl. 308—213)

This invention relates to roller bearings which comprise a race member or ring, a plurality of rollers, and roller retaining members at the ends of the race member for holding the rollers against both endwise or axial and lateral displacement.

Generally the roller retaining members of such bearings are rings and at least one is separate from but secured on one end of the race ring to permit assembly of the rollers on the race ring.

Heretofore, the roller retainer ring in some cases has been in the form of a flanged sheet metal ring having a portion secured to the race ring as by spinning the sheet metal into a groove in the race ring, for example as shown in Patent No. 2,057,102; while in other bearings the race ring and retainer ring have been formed in their adjoining and contacting surfaces with complemental or registering grooves in which is arranged a split spring locking ring that overlies the joint between the race ring and the retainer ring, for example, as shown in Patent No. 1,236,950. Also, it has been proposed to pour molten metal into a recess formed between wedge surfaces on the race ring and the retainer ring so that upon hardening of the metal, the retainer ring will be fastened to the race, for example, as shown by Patent No. 1,289,827.

These known structures have not been satisfactory under all conditions, especially when the retainer rings are placed under strains during insertion of the bearings into journal boxes or bearing housings. Sheet metal retainers are satisfactory on small size bearings that may be handled on work benches but on large sizes where the shafts must be hoisted mechanically there is a tendency to knock the retainer ring when entering the shaft in the bearing, which may bend the retainer. The split spring ring may be contracted into one of the grooves in which it is mounted by wedge action between the sides of the grooves and the sides of the spring ring, so as to permit the retainer ring to separate from the race ring and release the rollers; and also the play required between the split locking ring and the grooves to permit assembly of the parts, is objectionable because it allows relative movement or play between the retainer ring and the race ring. The molded metal joint as shown in Patent No. 1,289,827 is objectionable because of difficulty in assembling the retainer ring concentrically with the race, and due to the opposed wedge surfaces on the race ring and retainer ring and the necessarily relatively soft metal of the joint, the joint metal may be squeezed out under end thrusts on the bearing so as to loosen the retainer ring and produce play between the race ring and the retainer ring.

Therefore, a prime object of my invention is to provide a roller bearing of the general character described which shall be free of the above mentioned objections to known bearings, and wherein the retainer ring shall be secured in the race ring concentrically and positively against movement.

Another object is to provide such a bearing that shall include a novel and improved molded metal joint between the race ring and the retainer ring, which can be easily, rapidly and inexpensively produced.

A further object is to provide a novel and improved reenforced molded metal joint between a race ring and a retainer ring of a roller bearing of the character described.

Another object is to provide a joint between a race ring and a retainer ring for roller bearings of this character, which shall include a locking member such as radial pins, balls, a steel ring, or pieces of wire, at least a portion of which shall be disposed in registering grooves or recesses in the contacting surfaces of the race and retainer ring and cross the space between said contacting surfaces, and molded metal surrounding said locking member in said grooves or recesses, whereby the molded metal is reenforced by the locking member or prevents play or looseness of the locking member in said grooves so as to positively hold the locking member in locking position.

Other objects, advantages and results of the invention will appear to those skilled in the art from the following description and accompanying drawings in which Figure 1 is a half side elevational and half sectional view of a roller bearing embodying my invention.

Figure 2 is a fragmentary end elevational view with portions broken away and shown in section on the line 2—2 of Figure 1.

Figure 3 is an enlarged transverse vertical sectional view taken on the line 3—3 of Figure 2.

Figure 4 is a similar view taken on the line 4—4 of Figure 2.

Figure 5 is a view similar to Figure 2 showing a modified form of the invention.

Figure 6 is a view similar to Figure 4 taken on the line 6—6 of Figure 5.

Figure 7 is a view similar to Figure 3 showing a further modification of the invention.

Figure 8 is a view similar to Figure 2 showing a modification of the invention.

Figure 9 is an enlarged transverse vertical sectional view on the line 9—9 of Figure 8.

Figure 10 is a view like Figure 8 showing another modification of the invention.

Figure 11 is a view similar to Figure 9 on the line 11—11 of Figure 10.

Figure 12 is a view similar to Figure 2 showing another form of the invention.

Figure 13 is a view similar to Figure 3 on the line 13—13 of Figure 12.

Figure 14 is a view like Figure 12 showing a still further modified form of the invention, and Figure 15 is a view similar to Figure 13 on the line 15—15 of Figure 14.

Referring to Figures 1 to 4 inclusive of the drawings, the reference characters A and B designate respectively the race ring and the retainer rings. As shown, there is a retainer ring at each end of the race ring, although in some cases one of the retainer rings may be replaced by an integral flange on the race ring. Each retainer ring has an inwardly extending flange 1 which cooperates with trunnions 2 on the ends of rollers C of a known construction which cooperate with the race ring and are held by the retainer rings against both axial and lateral displacement with respect to the race ring.

Each end of the race ring A has an interior seat for the corresponding retainer ring B. As shown, each seat consists of a counterbore or circumferential rabbet having an annular surface 3 at its outer end concentric with the race ring and of a diameter slightly greater than the diameter of the retainer ring and substantially greater than the interior diameter of the race ring. The plane of the base 4 of the rabbet is approximately perpendicular to the axis of the race ring. The rabbet also includes an undercut or reentrant circumferential groove 5 of a diameter greater than the annular surface 3 and spaced inwardly of the outer end of the race ring with its inner end flush with or in continuation of the base 4 of the counterbore.

Each retainer ring B has a circumferential groove 6 in its outer periphery which is spaced inwardly from the outer face of the retainer ring a distance substantially equal to the width of the annular surface 3 of the race ring. Each groove 6 is of a width less than the width of the reentrant groove 5 and registers with a portion of said groove. The inner face of each retainer ring seats snugly against the base 4 of the corresponding counterbore of the race ring, and accordingly the inner peripheral edge 8 of the retainer ring is spaced from the bottom of the reentrant groove 5.

In accordance with this form of the invention, the retainer rings B are rigidly and permanently locked or fastened on the race ring by a molded metal joint which comprises suitable metal, such as Babbitt metal 9, which is forced into the grooves 5 and 6 in molten condition and thereafter allowed to harden. Preferably the molten metal is forced into the grooves under pressure through one or more radial openings 10 in the race ring which communicate with the respective grooves 5. The metal is preferably of a nature which will expand on hardening so as to provide a tight joint between the race ring and the retainer rings.

It will be observed that due to the nice fit of the outer peripheries of the retainer rings on the annular surfaces 3 of the race ring, the retainer rings will be held accurately in concentric relation to the race ring during assembly of the parts. Due to the space between the inner peripheral edges 8 of the retainer rings and the corresponding reentrant grooves 5, no difficulty is encountered in accurately seating the inner faces of the retainer rings on the bases 4 of the rabbets. This is in contrast to the difficulty that would be encountered if it were attempted to fit the inner peripheral edges of the retainer rings into the corners of the rabbet as indicated at X in Figure 6. Not only would such an attempt result in trouble in machining the contacting surfaces, but due to bad fitting of the parts or cutting away of the edge of the retainer ring as might be required as indicated at Y in Figure 7, the molten metal might be forced between the race ring and the retainer rings onto the trunnions of the rollers C and thereby spoil the bearing.

The race ring, retainer rings and rollers may be assembled in the usual manner with the roller trunnions 2 disposed between the flanges 1 and the inner surface of the race ring A, as clearly shown in Figures 1, 3 and 4. With this construction, it will be observed that the molded metal joint 9 crosses or traverses the joints or spaces between the retainer rings and the race ring so as to effectually reenforce the retainer rings against end thrusts on the bearing, while the contact of the outer peripheries of the retainer rings with the annular surfaces 3 effectually prevents any movement of the retainer rings in their own planes or transversely of the axis of the bearing. Accordingly, the retainer rings will be held at all times concentric with the race ring, and this will be understood to be highly important because should the retainer rings become eccentric, they might frictionally and detrimentally contact with the shaft or inner race ring which is disposed within the bearing.

A modification of the invention is shown in Figures 5 and 6 where the end of the race ring D has an inner circumferential rabbet or seat 11 for the retainer ring E. The contacting circumferential surfaces 12 and 13 of the retainer ring E and the rabbet 11, respectively, are provided with registering or complemental grooves 15 and 16 in which is arranged a split spring locking ring 17. The cross section of this ring may be as desired, but is shown as rectangular. The groove 15 in the retainer ring is of a sufficient depth to permit the locking ring 17 to be compressed below the peripheral surface of the retainer ring so as to permit the retainer ring with the spring to be inserted into the rabbet 11. The groove 16 in the rabbet 11 is of a depth less than the thickness of the locking ring 17 so that as the retainer ring is slipped into the rabbet and the grooves 15 and 16 register with each other, the locking ring 17 will spring outwardly into the groove 16 and traverse the joint or space between the contacting surfaces 12 and 13 of the retainer ring and race ring.

It will be observed that the locking ring itself would fasten the retainer ring on the race ring, but it is necessary that there be a slight play between the locking ring and the walls of the grooves to permit the locking ring to move in the grooves. Such play would be objectionable and might increase on wear of the bearing so as to permit sufficient movement of the retainer rings to release the rollers from the race ring.

To overcome this difficulty, I contemplate forcing molten metal, like the metal of the molded joint 9, into the grooves 15 and 16 around the locking ring 17. This molten metal is indicated by the reference character 18 and may be inserted into the grooves through one or more radial openings 19 in the race ring. It will be noted that the metal will enter the space between the ends of the split locking ring 17 as indicated at 20. With this construction, a reenforced molded metal joint is provided, the steel spring locking ring 17 effectually resisting end thrusts on the retainer rings, and the molded metal effectually preventing play between the parts.

Another modification of the invention is shown in Figure 7 where the annular surface 21 of the rabbet 22 in the end of the race ring F is formed with a circumferential groove 23 the base of which is beveled in diverging directions from a median plane of the groove as indicated at 24. The groove 25 in the peripheral surface of the retainer ring G is similarly formed so that when the grooves 24 and 25 are brought into register with each other as shown in Figure 7, a double dove-tail recess is formed between the race ring and the retainer ring. Molten metal 26 which will contract upon hardening is forced into the grooves 24 and 25 through one or more radial openings 26 in the race ring. As this molten metal hardens and contracts, due to the beveled surfaces of the grooves 24 and 25, the parts will be tightly secured together and all possible looseness between the retainer ring and the race ring will be obviated. If desired, the grooves 23 may be extended so that one side wall thereof will be flush or in continuation with the base of the rabbet 22 that is perpendicular to the axis of the race ring, corresponding to the relationship of the reentrant groove 5 and the base 4 of the rabbet in the form of the invention shown in Figure 1.

In Figures 8 to 11 inclusive, I have shown modifications of the invention wherein the molded metal serves as a reenforcing or holding agent for locking members which lock together the race rings and retainer rings.

Referring particularly to Figures 8 and 9, the race ring and retainer ring are in general of the same construction as the race ring and retainer ring shown in Figures 1 to 3 inclusive, the main difference being that the radial openings 30 are provided in the race ring in register with the groove 6 in the retainer ring, and steel pins 31 are fitted in said radial openings with their inner ends seated in the groove 6. The pins are provided with circumferential grooves or reduced portions 32 which are surrounded by the molded metal 33 that is injected into the groove 5 of the race ring and groove 6 of the retainer ring through one or more radial openings 34. With this construction, the pins 31 serve as the locking members for fastening the retainer rings in the race ring, and the molded metal 33 reenforces or holds the locking members in locking position. It is of course not necessary that the molded metal extend throughout the grooves 5 and 6, it being merely essential that the molded metal surround the pins 31.

In Figures 10 and 11, the race ring and retainer ring are similar to those of Figures 8 and 9, the main difference being that the reentrant groove 5 of Figure 8 is made narrower as indicated at 50 in Figure 11 so as not to extend entirely across the radial openings 37. Locking members in the form of balls 36 are inserted through the openings 37 into the circumferential groove in the retainer ring. The diameter of the balls is such that they are held against circumferential movement by contact with the inner ends of the walls of the respective openings 37, and extend across the space between the circumferentially contacting surfaces of the race ring and retainer ring to lock said rings together. Molten metal is injected into the openings 37 and grooves 50 and 36 so as to hold the balls positively in locking position.

It will be observed, with the construction shown in Figures 8 and 9, that if the pins 31 are made of soft steel, they may be drilled out of the openings 30 and groove 6 to permit separation of the race ring and retainer ring.

In Figures 12 to 15 inclusive, I have shown forms of the invention wherein reenforcing elements are provided for the molded metal joint between the race ring and the retainer ring. Referring particularly to Figures 12 and 13, the race ring and retainer ring are in general of the same construction as shown in Figures 1 to 3 inclusive, the main difference being that reenforcing elements, preferably formed of steel, are arranged in the grooves 5 and 6 of the race ring and retainer ring, surrounded by the molded metal, and extending across the space between the contacting circumferential surfaces of the race ring and the retainer ring. As shown, the reenforcing elements consist of arcuate pieces of spring steel wire 39 disposed in the grooves 5 and 6 and embedded in the molded metal 40 that is inserted into the grooves through a radial opening 41. In initially assembling the retainer ring and the race ring, these arcuate locking members are compressed into the groove 6 of the retainer ring so as to permit the retainer ring to be slipped axially into the circumferential rabbet in the end of the race ring until the grooves 5 and 6 register with each other. The locking members 39 will then spring outwardly into the groove 5.

In Figures 14 and 15, the reenforcing members 40 are in the form of balls 42 disposed in the grooves 5 and 6 and surrounded by the molded metal 43, the balls being of such diameter that a portion of each thereof will cross the space between the contacting circumferential surfaces of the race ring and retainer ring. In assembling the parts after the retainer ring has been inserted into the rabbet of the race ring, the balls may be inserted into the grooves 5 and 6 through one or more radial openings 44 in the race ring through which also the molten metal may be injected into the grooves.

While I have shown and described the invention as embodied in several now preferred forms and different details of structure, it should be understood that this is primarily for the purpose of illustrating the principles of the invention, and that many modifications and changes may be made in the details of structure of the bearing without departing from the spirit or scope of the invention. The invention may be utilized for fastening retainer rings to inner race rings as well as outer race rings, and the rabbets and reentrant grooves may be formed in either the race ring or the retainer ring.

Having thus described my invention, what I claim is:

1. A roller bearing comprising a race ring, rollers cooperating with said race ring, and a retainer ring for holding said rollers against displacement with respect to said race ring, one of said race ring and retainer ring having a circumferential rabbet in one end to receive the other, said rabbet having an annular surface concentric with the race ring and a base surface the plane of which is perpendicular to the axis of the bearing, a portion of said annular surface being in contact with the circumferential surface of the other of said race ring and retainer ring, there being a reentrant groove in said annular surface of the rabbet and the other of said race ring and retainer ring having a circumferential groove registering with a portion of said reentrant groove, and metal molded in and filling said grooves.

2. The roller bearing set forth in claim 1 wherein the portions of said annular surface of the race ring and the circumferential surfaces of said retainer ring outwardly of said grooves are in mutual contact and concentric with said race ring while the other portions of said annular and circumferential surfaces adjacent the base of the rabbet are in spaced relation.

3. A roller bearing comprising a race ring, rollers cooperating with said race ring, and a retainer ring for holding said rollers against displacement with respect to said race ring, said race ring having an inner circumferential rabbet at its end to receive said retainer ring, said rabbet being formed with a base surface the plane of which is perpendicular to the axis of the race ring and against which one face of said retainer ring abuts, said rabbet also having annular surfaces portions of which are concentric with the race ring and in contact with portions of the outer circumferential surface of said retainer ring, the other portions of said annular surfaces of the rabbet and said circumferential surface of the retainer ring having registering circumferential grooves, and metal molded in and filling said grooves.

4. The roller bearing set forth in claim 3 wherein the portions of the circumferential surface of said retainer ring adjacent said base surface of the rabbet are spaced from the annular surface of said rabbet.

5. The roller bearing set forth in claim 1 with the addition of a reenforcing element embedded in said molded metal and crossing the space between said contacting surfaces of the race ring and retainer ring.

6. The roller bearing set forth in claim 3 with the addition of locking members in said grooves and crossing the space between said contacting surfaces of the race ring and the retainer ring, said molded metal holding said locking members against displacement.

7. The roller bearing set forth in claim 3 wherein said race ring has a plurality of radial openings registering with said grooves in the retainer ring and with the addition of locking pins in said radial openings with portions crossing the space between said contacting surfaces of the race ring and retainer ring, said molded metal surrounding and holding said locking pins in position.

VICTOR L. BARR.